(12) United States Patent
Goetz

(10) Patent No.: US 12,053,829 B2
(45) Date of Patent: *Aug. 6, 2024

(54) DEVICE FOR TRANSMITTING TORQUE FROM A DRILL TO A DRILL BIT

(71) Applicant: Hilti Aktiengesellschaft, Schaan (LI)

(72) Inventor: Florian Goetz, Frastanz (AT)

(73) Assignee: Hilti Aktiengesellschaft, Schaan (LI)

( * ) Notice: Subject to any disclaimer, the term of this patent is extended or adjusted under 35 U.S.C. 154(b) by 148 days.

This patent is subject to a terminal disclaimer.

(21) Appl. No.: 17/784,376

(22) PCT Filed: Dec. 7, 2020

(86) PCT No.: PCT/EP2020/084808
§ 371 (c)(1),
(2) Date: Jun. 10, 2022

(87) PCT Pub. No.: WO2021/115987
PCT Pub. Date: Jun. 17, 2021

(65) Prior Publication Data
US 2023/0066196 A1    Mar. 2, 2023

(30) Foreign Application Priority Data

Dec. 11, 2019  (EP) .................................... 19215080

(51) Int. Cl.
*B23B 45/00* (2006.01)
(52) U.S. Cl.
CPC .................. *B23B 45/003* (2013.01)
(58) Field of Classification Search
CPC .................................................. B23B 45/003
See application file for complete search history.

(56) References Cited

U.S. PATENT DOCUMENTS 3,498,624 A * 3/1970 Koch ................ B23B 31/10741
279/81
3,622,169 A * 11/1971 Koch .................. B23B 31/1071
279/904

(Continued)

FOREIGN PATENT DOCUMENTS

DE    2 044 095 A1    3/1971
DE    36 05 970 C2    8/1987

(Continued)

OTHER PUBLICATIONS

U.S. Appl. No. 17/784,384 (Year: 2022).*

(Continued)

*Primary Examiner* — Nathaniel C Chukwurah
(74) *Attorney, Agent, or Firm* — Crowell & Moring LLP

(57) ABSTRACT

A device for transmitting a torque produced by a drill includes a shank having a first outer conical region, a groove region, a second outer conical region, and a plurality of first longitudinal grooves extending over the first outer conical region, the groove region, and the second outer conical region and having a plurality of second longitudinal grooves extending over the second outer conical region. A tool fitting has a rotary driving part. The rotary driving part has an inner conical region and an inner driver region where the inner driver region has a plurality of first inner rotary drivers with a first width and first depth and a plurality of second inner rotary drivers with a second width and second depth. The first depth and the second depth are identical and the second longitudinal grooves also extend over the first outer conical region and the groove region.

4 Claims, 4 Drawing Sheets

(56) References Cited

U.S. PATENT DOCUMENTS

| | | | | |
|---|---|---|---|---|
| 4,701,083 A | * | 10/1987 | Deutschenbaur | ... B23B 31/1072 |
| | | | | 279/97 |
| 6,612,588 B2 | * | 9/2003 | Ostermeier | ........... B23B 31/008 |
| | | | | 279/904 |

FOREIGN PATENT DOCUMENTS

| | | |
|---|---|---|
| DE | 195 21 993 A1 | 1/1997 |
| EP | 0 175 088 A1 | 3/1986 |
| EP | 1 211 005 B1 | 6/2002 |
| EP | 3 085 479 A1 | 10/2016 |

OTHER PUBLICATIONS

PCT/EP2020/084808, International Search Report dated Feb. 17, 2021 (Two (2) pages).

U.S. Patent Application, "Device for Transmitting Torque from a Drill to a Drill Bit", filed Jun. 10, 2022, Inventor Florian Goetz.

U.S. Patent Application, "Apparatus for Transmission of Torque from a Drill Device to a Core Bit", filed Jun. 10, 2022, Inventor Florian Goetz.

* cited by examiner

DEVICE FOR TRANSMITTING TORQUE FROM A DRILL TO A DRILL BIT

BACKGROUND AND SUMMARY OF THE INVENTION

The present invention relates to a device for transmitting a torque from a drill to a drill bit.

EP 1 211 005 B1 discloses a known device for transmitting torque from a drill to a drill bit. The device for transmitting torque is arranged between the drill and the drill bit and transmits the torque, which is produced by a drill motor of the drill, to the drill bit. The device for transmitting torque comprises a tool fitting which is permanently connected to the drill or is connected to the drill via a releasable connection, and a shank which is permanently connected to the drill bit or is connected to the drill bit via a releasable connection.

The shank is constructed in a sleeve-shaped manner from a first outer conical region, a groove region, a second outer conical region and a cylinder region and comprises a plurality of first longitudinal grooves extending over the first outer conical region, the groove region, the second outer conical region and the cylinder region, and a plurality of second longitudinal grooves extending over the second outer conical region and the cylinder region. The number of the plurality of first longitudinal grooves is identical to the number of the plurality of second longitudinal grooves. The second longitudinal grooves are different from the first longitudinal grooves and differ in that the second longitudinal grooves are restricted to the second outer conical region and to the cylinder region and do not extend over the first outer conical region and the groove region.

The tool fitting is constructed from a rotary driving part and a locking device. The locking device is adjustable parallel to a longitudinal axis of the tool fitting between a receiving position and a locking position, wherein the shank is insertable into the tool fitting in the receiving position and is connected to the tool fitting in the locking position. The rotary driving part has a basic body and an intermediate element which are connected in a form-fitting manner in the connected state of the device.

The intermediate element comprises an inner driver region, which has a plurality of first inner rotary drivers with a first width and first depth and a plurality of second inner rotary drivers with a second width and second depth, and an outer driver region, which has a plurality of first outer rotary drivers with a third width and third depth. The number of the plurality of first inner rotary drivers, the number of the plurality of second inner rotary drivers and the number of the plurality of first outer rotary drivers correspond.

The basic body is sleeve-shaped with an inner conical region and a rotary driving region which has a plurality of first rotary driving grooves, wherein the first outer rotary drivers of the intermediate element engage in the first rotary driving grooves of the basic body. In the connected state of the tool fitting and the shank, the first inner rotary drivers engage in the first longitudinal grooves, the second inner rotary drivers engage in the second longitudinal grooves, and the first outer rotary drivers engage in the first rotary driving grooves.

The device for transmitting torque that is known from EP 1 211 005 B1 has the disadvantage that the tool fitting and the shank are approved only for drills having outputs of up to approx. 2.5 kW. At greater outputs, the surface pressure is very high, which can damage the inner and outer rotary drivers of the tool fitting. In addition, the service life of the tool fitting and of the shank is reduced.

The object of the present invention is to further develop the tool fitting and the shank of the device for transmitting torque that is known from EP 1 211 005 B1 such that the new device can transmit higher torques than the old device, the new shank can be connected to the old tool fitting and the new tool fitting cannot be connected to the old shank.

This object is achieved according to the invention in the case of the device for transmitting a torque mentioned at the beginning by the features of the independent claim(s). Advantageous developments are specified in the dependent claims.

According to the invention, it is provided that the first depth of the first inner rotary drivers and the second depth of the second inner rotary drivers are identical, and the second longitudinal grooves of the shank also extend over the first outer conical region and the groove region. Owing to the fact that, in the case of the new tool fitting, the second depth of the second inner rotary drivers is identical to the first depth of the first inner rotary drivers, the second inner rotary drivers in the case of the new tool fitting have a greater second depth than in the case of the old tool fitting. The greater second depth of the second inner rotary drivers increases the contact area between the new tool fitting and the new shank and enables higher torques to be transmitted from the drill to the drill bit.

The greater second depth of the second inner rotary drivers prevents the new tool fitting, which is designed for powerful drills, from being able to be connected to the old shank, which is approved only for drills with outputs of up to approx. 2.5 kW, and thus increases the operational safety of the drill. Since the second longitudinal grooves of the old shank extend only over the second outer conical region and have a small depth, the second inner rotary drivers of the new tool fitting are too deep and cannot be inserted into the second longitudinal grooves of the old shank.

The second longitudinal grooves, which in the case of the new shank extend over the first outer conical region, the groove region and the second outer conical region, have a greater depth than the second longitudinal grooves of the old shank. This means that the new shank can be connected to the old tool fitting. The second inner rotary drivers of the inner driver region engage in the second longitudinal grooves of the new shank. The new shank is designed for powerful drills and approved for greater forces and torques than the old tool fitting, which is not critical in operation. Operating a shank with outputs or torques that are lower than the permitted maximum value can have a positive effect on the service life of the shank.

The first width of the first inner rotary drivers and the second width of the second inner rotary drivers are preferably identical. The same depth and the same width of the first and second inner rotary drivers has the advantage that there is no need to assign the first inner rotary drivers to the first longitudinal grooves or the second inner rotary drivers to the second longitudinal grooves. Each inner rotary driver can be inserted into any longitudinal groove.

In a preferred variant, the inner conical region and the inner driver region are formed in one piece. The single-piece formation of the rotary driving part has the advantage that, in comparison to the old device for transmitting torque, an interface is no longer necessary. In the case of the old device for transmitting torque, the force or the torque is transmitted from the basic body to the intermediate element (first interface) and from the intermediate element to the shank (second interface). In the case of the new device for transmitting torque, the force or the torque has to be transmitted only from the rotary driving part to the shank.

In an alternative variant, the inner conical region and the inner driver region are formed in multiple pieces. The multi-piece formation of the rotary driving part has the advantage that rotary driving parts having a complex geometry can be manufactured more simply than in the case of a single-piece formation of the rotary driving part.

Exemplary embodiments of the invention are described hereinafter with reference to the drawings. It is not necessarily intended for this to illustrate the exemplary embodiments to scale; rather, the drawings are produced in a schematic and/or slightly distorted form where this is useful for explanation purposes. It should be taken into account here that various modifications and alterations relating to the form and detail of an embodiment may be undertaken without departing from the general concept of the invention. The general concept of the invention is not limited to the exact form or the detail of the preferred embodiment shown and described hereinafter or limited to subject matter that would be limited compared to the subject matter claimed in the claims. For given dimensioning ranges, values within the stated limits should also be disclosed as limit values and should be able to be used and claimed as desired. For the sake of simplicity, identical reference signs are used hereinafter for identical or similar parts or parts having identical or similar functions.

DETAILED DESCRIPTION OF THE DRAWINGS

Figure 1:
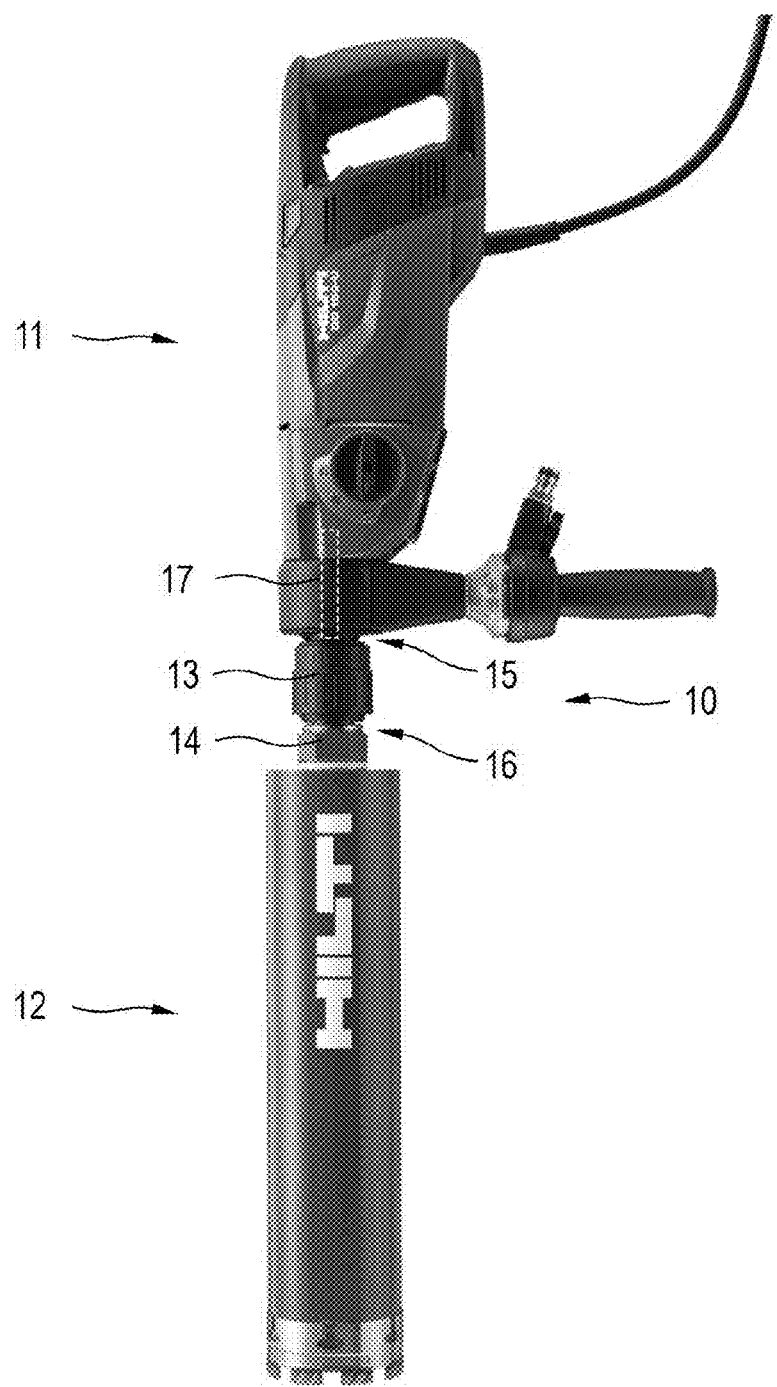
FIG. 1 shows a device according to the invention for transmitting torque from a drill to a drill bit.

FIG. 1 shows a device 10 according to the invention for transmitting a torque from a drill 11 to a drill bit 12. The device 10 is arranged between the drill 11 and the drill bit 12 and transmits the torque from the drill 11 to the drill bit 12.

The device 10 is constructed from a tool fitting 13, which is connected to the drill 11, and a shank 14, which is connected to the drill bit 12. The device 10 is connected to the drill 11 via a first connection 15 and to the drill bit 12 via a second connection 16. In the connected state of the device 10, torque is transmitted via the following components: drive shaft 17 of the drill 11, tool fitting 13, shank 14 and drill bit 12. The connected state of the device 10 is defined as the state in which the tool fitting 13 and the shank 14 are connected.

Figure 2A:
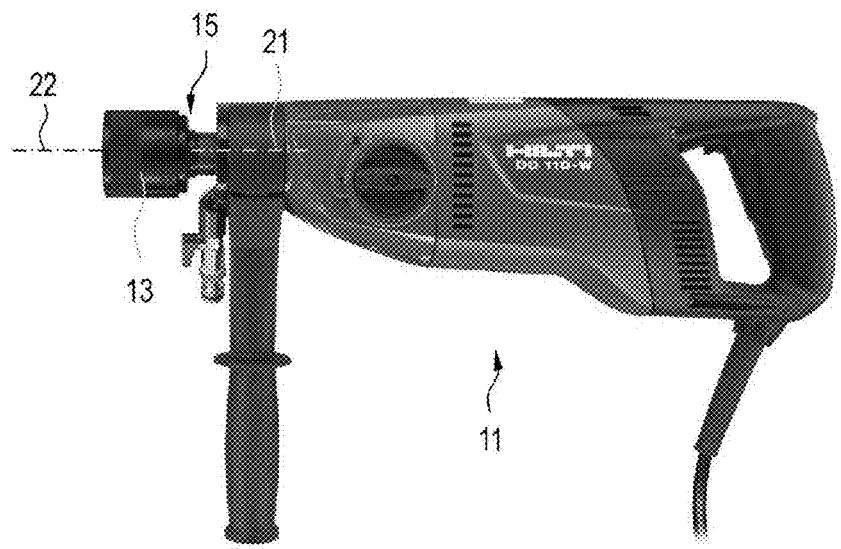
FIGS. 2A, 2B show a tool fitting (FIG. 2A) and a shank (FIG. 2B) of the device according to the invention for transmitting torque that is illustrated in FIG. 1.
Figure 2B:
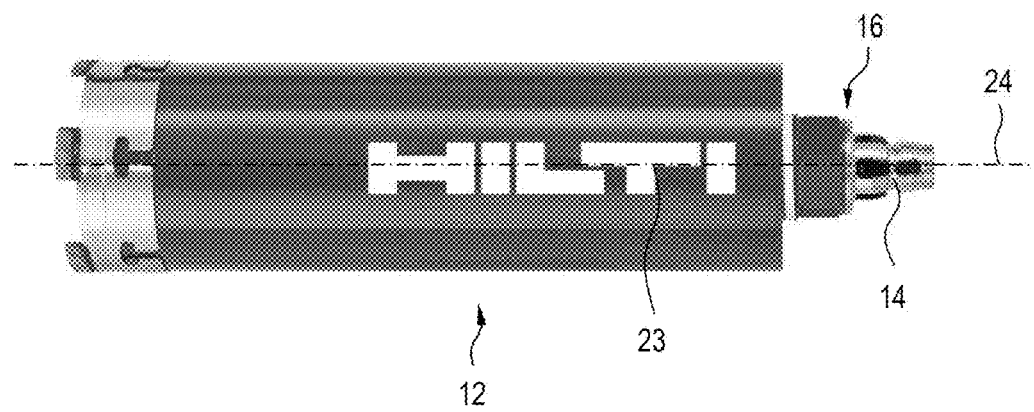

FIGS. 2A, 2B show the drill 11 with the tool fitting 13 (FIG. 2A) and the drill bit 12 with the shank 14 (FIG. 2B) of the device 10 according to the invention. The tool fitting 13 and the shank 14, in the connected state, form the device 10 according to the invention of FIG. 1.

The tool fitting 13 is connected to the drill 11 via the first connection 15, which in the exemplary embodiment is designed as a releasable connection; alternatively, the tool fitting 13 can be connected to the drill 11 via a non-releasable first connection 15. Since the tool fitting 13 is a wearing part, it makes sense to design the tool fitting 13 as a separate component and to connect it to the drive shaft 17 of the drill 11 via a releasable first connection. In order to ensure that the drill 11 is operated only with an approved tool fitting 13, it makes sense to design the first connection 15 in such a way that it can be operated only with a special tool.

The shank 14 is connected to the drill bit 12 via the second connection 16, which is designed as a releasable connection in the exemplary embodiment. For this purpose, the drill bit 12 has an internal thread which is connected to an external thread of the shank 14. The releasable second connection 16 is designed, for example, as a metric ISO threaded connection or other releasable connection. Instead of the releasable second connection 16, the shank 14 can be connected non-releasably to the drill bit 12; for this purpose, the shank 14 can be connected non-releasably to the drill bit 12, for example by welding or other methods.

The drive shaft 17 is designed to be rotatable about a first axis of rotation 21 which, in the connected state of the tool fitting 13 and the drill 11, coincides with a longitudinal axis 22 of the tool fitting 13. The drill bit 12 is designed to be rotatable during operation about a second axis of rotation 23 which, in the connected state of the shank 14 and the drill bit 12, coincides with a longitudinal axis 24 of the shank 14. For differentiation purposes, the longitudinal axis 22 of the tool fitting 13 is referred to as the first longitudinal axis 22 and the longitudinal axis 24 of the shank 14 is referred to as the second longitudinal axis 24. In the connected state of the drill 11 and the drill bit 12, the first longitudinal axis 22 and second longitudinal axis 24 are arranged coaxially to one another.

Figure 3A:
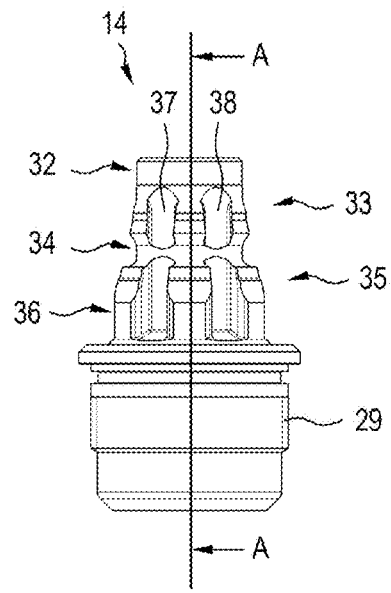
FIGS. 3A, 3B show the shank of the device according to the invention for transmitting torque in a side view (FIG. 3A) and in a longitudinal section along the section plane A-A in FIG. 3A (FIG. 3B)
Figure 3B:
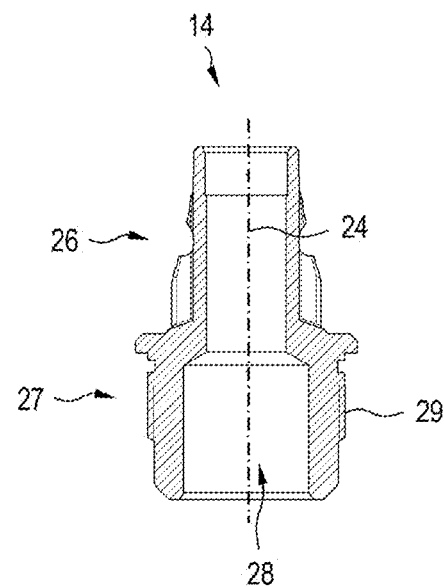

FIGS. 3A, 3B show the shank 14 of the device 10 according to the invention for transmitting torque in the non-connected state of the device 10 in a side view (FIG. 3A) and in a longitudinal section along the section plane A-A in FIG. 3A (FIG. 3B). The shank 14 is constructed from a first portion 26 and a second portion 27, which in the exemplary embodiment are formed in one piece and have a central through-hole 28.

The second portion 27 of the shank 14 has an external thread 29, forming the second threaded connection 16 with a matching internal thread of the drill bit 12. The first portion 26 of the shank 14 is composed of five portions and includes a front region 32, a first outer conical region 33, a groove region 34, a second outer conical region 35 and a cylinder region 36. The first and second outer conical region 33, 35 have a first or second conical outer surface which widens in the direction of the drill bit 12. The conical outer surfaces are produced for example by turning; by manufacturing the first and second conical outer surface in one setting, high manufacturing accuracy can be achieved.

The shank 14 has a plurality of first longitudinal grooves 37 and a plurality of second longitudinal grooves 38, which extend parallel to the second longitudinal axis 24 of the shank 14 and are arranged on the outside of the first portion 26. The first longitudinal grooves 37 and second longitudinal grooves 38 are identically formed and extend over the first outer conical region 33, the groove region 34 and the second outer conical region 35 and also over the cylinder region 36. The first longitudinal grooves 37 and second longitudinal grooves 38 are uniformly distributed in a circumferential direction 39 of the shank 14 and are arranged alternately, each first longitudinal groove 37 being arranged between two second longitudinal grooves 38. In the exemplary embodiment, the shank 14 has three first longitudinal grooves 37 and three second longitudinal grooves 38; it generally applies that the number of the plurality of first longitudinal grooves 37 is identical to the number of the plurality of second longitudinal grooves 38.

Figure 4A:
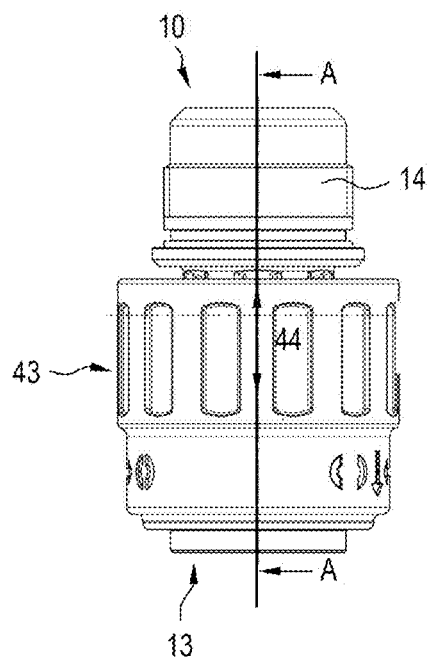
FIGS. 4A, 4B show the device according to the invention for transmitting torque of FIG. 1 in the connected state in which the shank of FIG. 2B is connected to the tool fitting of FIG. 2A, in a side view (FIG. 4A) and in a longitudinal section along the section plane A-A in FIG. 4A (FIG. 4B)
Figure 4B:
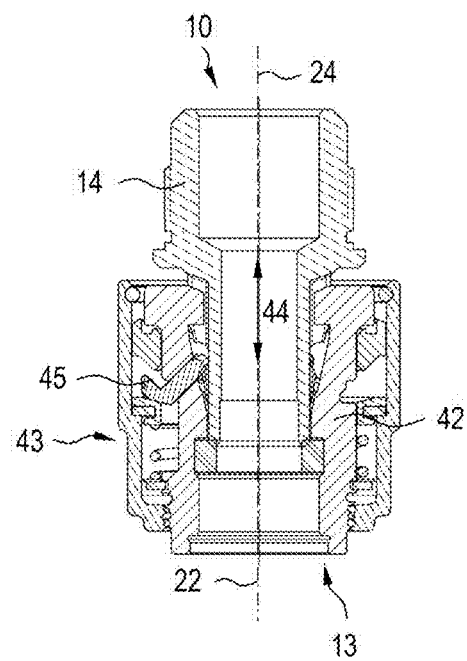

FIGS. 4A, 4B show the device 10 according to the invention for transmitting torque in the connected state, in which the shank 14 is connected to the tool fitting 13, in a side view (FIG. 4A) and in a longitudinal section along the section plane A-A in FIG. 4A (FIG. 4B).

The tool fitting 13 is constructed from a rotary driving part 42 and a locking device 43. The locking device 43 is designed to be adjustable relative to the rotary driving part 42, wherein the locking device 43 is designed to be displaceable in a longitudinal direction 44 that runs parallel to the first longitudinal axis 22 of the tool fitting 13, and to be rotatable about the first longitudinal axis 22 of the tool fitting 13. The locking device 43 is adjustable between a plurality of positions, which are referred to as the basic position, receiving position and locking position.

In order to be able to connect the shank 14 to the tool fitting 13 in a form-fitting manner, the locking device 43 is shifted from the basic position in the longitudinal direction 44 into the receiving position. In the receiving position, the shank 14 is inserted into the tool fitting 13. To lock the device 10, the locking device 43 is rotated about the first longitudinal axis 22 into the locking position. In the process, locking elements 45 of the locking device 43 engage in the groove region 34 of the shank 14 and lock the shank 14 to the tool fitting 13. The basic position of the locking device 43 is optional and can be omitted; the receiving position and locking position of the locking device 43 are necessary.

Figure 5A:
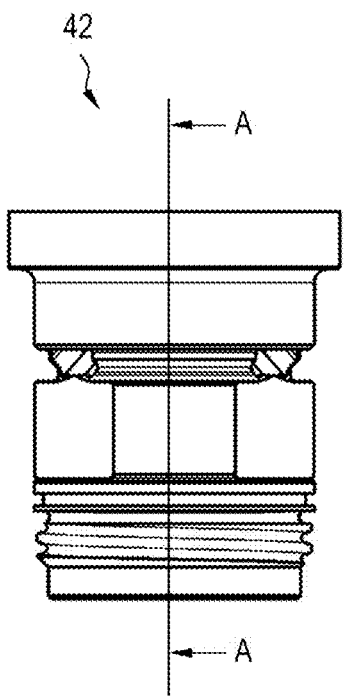
FIGS. 5A-C show a rotary driving part of the tool fitting in a side view (FIG. 5A), in a longitudinal section along the section plane A-A in FIG. 5A (FIG. 5B) and in a plan view of the interface with the shank (FIG. 5C).
Figure 5B:
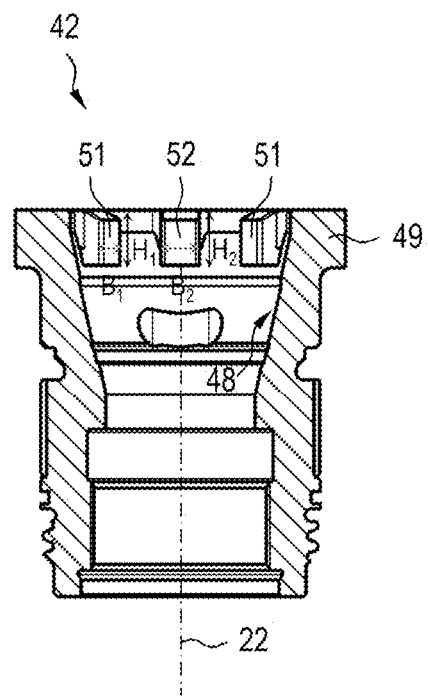
Figure 5C:
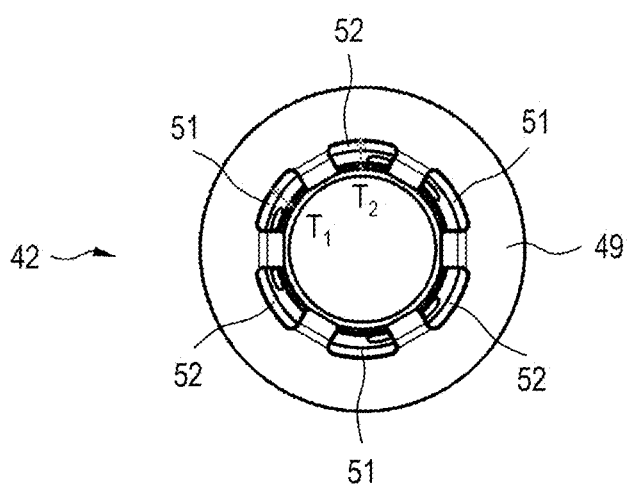

FIGS. 5A-C show the rotary driving part 42 of the tool fitting 13 in a side view (FIG. 5A), in a longitudinal section along the section plane A-A in FIG. 5A (FIG. 5B) and in a plan view of the interface with the shank 14 (FIG. 5C).

The rotary driving part 42 is sleeve-shaped with a central through-hole 47 and is composed of a plurality of portions, which in the exemplary embodiment are made in one piece. In addition to the internal thread, the rotary driving part 42 comprises an inner conical region 48 and an inner driver region 49. The inner driver region 49 has a plurality of first inner rotary drivers 51 and a plurality of second inner rotary drivers 52. In the connected state of the device 10, the first outer conical region of the shank 14 lies on the inner conical region 48 of the rotary driving part 42, the first inner rotary drivers 51 engage in the first longitudinal grooves 37 and the second inner rotary drivers 52 engage in the second longitudinal grooves 38.

The first and second inner rotary drivers 51, 52 are combined under the term "inner rotary drivers". In a plane 53 perpendicular to the first longitudinal axis 22, the first inner rotary drivers 51 have a first width $B_1$ and a first depth $T_1$ and the second inner rotary drivers 52 have a second width $B_2$ and a second depth $T_2$. Parallel to the first longitudinal axis 22, the first inner rotary drivers 51 extend over a first height $H_1$ and the second inner rotary drivers 52 extend over a second height $H_2$. In order to set the surface pressure to be as small as possible, the first height $H_1$ of the first inner rotary drivers 51 and the second height $H_2$ of the second inner rotary drivers 52 are as large as possible.

According to the invention, the first depth $T_1$ of the first inner rotary drivers 51 is identical to the second depth $T_2$ of the second inner rotary drivers 52. With the old tool fitting, the second depth of the second inner rotary drivers 52 is smaller than with the new tool fitting. The same depth ($T_1=T_2$) of the first inner rotary drivers 51 and second inner rotary drivers 52 has the advantage that the new tool fitting cannot be combined with the old shank, since the dimensions of the second longitudinal grooves 38 in the plane perpendicular to the second longitudinal axis 24 of the shank 14 are too small to be combined with the second inner rotary drivers 52.

In addition, in the exemplary embodiment of the device 10, the first width $B_1$ of the first inner rotary drivers 51 is identical to the second width $B_2$ of the second inner rotary drivers 52. The same depth ($T_1=T_2$) and the same width ($B_1=B_2$) of the first inner rotary drivers 51 and second inner rotary drivers 52 has the advantage that, when assembling the device 10, there is no need to assign the first inner rotary drivers 51 to the first longitudinal grooves 37 or the second inner rotary drivers 52 to the second longitudinal grooves 38.

The invention claimed is:

1. A device (10) for transmitting a torque which is produced by a drill (11) to a drill bit (12), comprising:
   a shank (14) having a first outer conical region (33), a groove region (34), a second outer conical region (35), and a plurality of first longitudinal grooves (37) extending over the first outer conical region (33), the groove region (34), and the second outer conical region (35) and having a plurality of second longitudinal grooves (38) extending over the second outer conical region (35); and
   a tool fitting (13) which has a rotary driving part (42) and a locking device (43);
   wherein the rotary driving part (42) has an inner conical region (48) and an inner driver region (49) and wherein the inner driver region (49) has a plurality of first inner rotary drivers (51) with a first width (B1) and first depth (T1) and a plurality of second inner rotary drivers (52) with a second width (B2) and second depth (T2);
   wherein the locking device (43) is adjustable parallel to a longitudinal axis (22) of the tool fitting (13) between a receiving position and a locking position and wherein the shank (14) is insertable into the tool fitting (13) in the receiving position and is connected to the tool fitting (13) in the locking position;
   wherein, in a connected state of the device (10), the first inner rotary drivers (51) of the rotary driving part (42) engage in the first longitudinal grooves (37) of the shank (14) and the second inner rotary drivers (52) of the rotary driving part (42) engage in the second longitudinal grooves (38) of the shank (14); and
   wherein the first depth (T1) of the first inner rotary drivers (51) and the second depth (T2) of the second inner rotary drivers (52) are identical and wherein the second longitudinal grooves (38) of the shank (14) also extend over the first outer conical region (33) and the groove region (34).

2. The device as claimed in claim 1, wherein the first width (B1) of the first inner rotary drivers (51) and the second width (B2) of the second inner rotary drivers (52) are identical.

3. The device as claimed in claim 2, wherein the inner conical region (48) and the inner driver region (49) are formed in multiple pieces.

4. The device as claimed in claim 1, wherein the inner conical region (48) and the inner driver region (49) are formed in one piece.

\* \* \* \* \*